US005578798A

United States Patent [19]
Nuyts

[11] Patent Number: 5,578,798
[45] Date of Patent: Nov. 26, 1996

[54] ON BOARD VEHICLE WEIGHING DEVICE HAVING LOAD CELLS

[75] Inventor: Henry Nuyts, Retie, Belgium

[73] Assignee: NV Nuyts ORB, Oud-Turnhout, Belgium

[21] Appl. No.: 169,664

[22] Filed: Dec. 20, 1993

[30] Foreign Application Priority Data

Dec. 22, 1992 [BE] Belgium ................................ 09201128
Sep. 24, 1993 [BE] Belgium ................................ 09300998

[51] Int. Cl.⁶ .................................................. G01G 19/08
[52] U.S. Cl. ................................................................ 177/136
[58] Field of Search ................................ 177/136, 137, 177/138, 139, 141

[56] References Cited

U.S. PATENT DOCUMENTS

| | | | |
|---|---|---|---|
| 2,109,460 | 3/1938 | Brasher | 177/136 |
| 3,580,343 | 5/1971 | Hogue et al. | 177/136 |
| 5,369,222 | 11/1994 | Strelioff | 177/136 |
| 5,393,936 | 2/1995 | Tyhy et al. | 177/138 |

FOREIGN PATENT DOCUMENTS

0476778  3/1992  European Pat. Off. .

*Primary Examiner*—Brian W. Brown
*Assistant Examiner*—Randy W. Gibson
*Attorney, Agent, or Firm*—Foley & Lardner

[57] ABSTRACT

A weighing device is mounted to a frame or chassis of a vehicle, particularly a truck. The weighing device comprises at least two weighing frames for supporting a load, such as a container and its content, to be weighed. Each weighing frame is connected to the vehicle chassis, either directly or through a supporting frame. Connecting elements are connected to the weighing frames and the vehicle chassis or the supporting and supports the weighing frames. The connecting elements have load cells to measure the weight of the load. Lifting devices are operatively connected to the weighing frames to lift the entire load away from the from the chassis during weighing, where the load is supported or suspended entirely by the connecting elements. The weighing frames, the supporting frames, the connecting elements, and the lifting devices together from a weighing unit that can be connected to the vehicle chassis.

23 Claims, 11 Drawing Sheets

ON BOARD VEHICLE WEIGHING DEVICE HAVING LOAD CELLS

BACKGROUND OF THE INVENTION

The invention relates to a weighing device for mounting on a vehicle, such as a truck or a similar vehicle, said weighing device comprising means for supporting a load to be weighed, said means being connected to connecting elements which are in the form of load cells, or which can comprise load cells, in which the load cells weigh the force being exerted on said means by the load.

SUMMARY OF THE INVENTION

A similar weighing device is known from DE-B-3501667. This known device is particularly suitable for weighing cattle to be transported by means of the truck and that is to be weighed during loading them onto the truck. Said means are in the shape of a platform across which the cattle is led to subsequently end up on the fixed part of the loading floor. The platform has been suspended to flexible elements by its four corners, a load cell having been provided in each of said elements. Obviously, instead of cattle, other goods can be led across the weighing platform as well.

Although such a weighing device is particularly suitable for said purpose, it is less suitable for weighing a container to be transported by means of the truck, for example.

On account of the fact that such a container is relatively large and has a considerable weight, the weighing platform as well as the connecting elements and its suspension points should be of a heavy design. This last mentioned fact also applies for the load cells, since they have to have a high capacity. Owing to this, the distance between the weighing platform and the suspension points connecting to the chassis of the vehicle will be great, and the weighing platform will be able to experience a considerable movement in its plane as well. The stability of the vehicle during weighing will be adversely affected by this.

Substantially the same applies when it is desirable to provide the truck with a loading body or loading frame for transport of goods which have to be weighed after bringing them into the loading body or onto the loading frame.

It will be obvious, that in all these cases, the known weighing device does not provide the possibility of putting the container, or the loading body, or the loading frame onto the one part of the vehicle and weighing it first, and after that putting it onto another part of the vehicle for transporting thereof.

Further, the position of the means for bringing the container onto and from the vehicle can cause problems during transport of the container.

The invention aims to remove these problems and to that end provides for, that the means are individual weighing frames, and that the weighing device comprises at least two of such weighing frames, each of them being connected to the chassis of the vehicle by at least one connecting element, either directly, or by means of a supporting frame, the connecting elements having a cardan or movable or flexible joint both at their end connected to the chassis of the vehicle and at their end connected to the weighing frame, the number of weighing frames and the number of connecting elements per weighing frame being at least that large, that there are at least four connecting elements in all, and such that the connecting lines going through both connecting points of each of the connecting elements, seen in plan view onto the vehicle, are divided across a plane, and consequently are mounted in or at the connecting elements, have been mounted in a position in which the force introduction axes through the load cells are in relation to the axes going through the connecting points of the connecting elements and to a horizontal plane, so that the weight of the load can be derived from the forces measured by the load cells.

By employing a sufficient number of weighing frames and connecting elements, the capacity of the latter can be kept low. Owing to this, the dimensions of the connecting elements and of their connecting points can be kept small.

Further, one can use the technique as described in EP-A-0 476 778, by which the distance between the connecting points of the connecting elements can be reduced further.

Further, the device can be designed such, that during weighing, the weighing frames can position themselves, in that they are laterally movable in relation to the chassis of the vehicle, and that the connecting elements have been designed such, that these enable lateral movement.

The connecting elements or the load cells can be under compressive strain, or under bending strain or under tensile strain.

In particular there will be at least two connecting elements and two load cells per weighing frame.

There can also be three connecting elements per weighing frame, the connecting lines of which, going through the upper and lower connecting points of the elements, seen in plan view onto the vehicle, are divided across a plane in such a way, that they are not on one line.

For a proper distribution of weight of the load across the vehicle, the weighing device will comprise four or more weighing frames, which have been mounted in pairs at both sides of the chassis of the vehicle.

Due to this, seen in transverse direction, the weighing frames will be situated apart across the maximum distance. For achieving said purpose, it will also be provided for, that at least two weighing frames of the weighing device have been mounted in front of the rear axle and two weighing frames behind the rear axle, or rear axles of the vehicle.

In particular, there will be means for keeping the weighing frames in position during the transition from transport condition to weighing condition, and the other way round.

In many cases, it will be desirable to connect the supporting frames connected to the connecting elements to the chassis by means of consoles protruding from the chassis. Because of this, one has more choice in positioning the connecting elements and the weighing frames in relation to the chassis.

In particular, the weighing frames can be provided with a cylinder or jack for pushing a load to be weighed up from its support on the chassis or from a part connected to the chassis.

In a device according to the invention, the load can be a container to be rolled onto the vehicle, said container being provided with two longitudinally extending supporting beams at the bottom side, which in transport condition will bear on the chassis, or an auxiliary frame connected thereto, of the vehicle, in which during weighing, the supporting beams of the container will bear on the weighing frames, possibly employing a lifting device such as a pressurized medium operated cylinder.

In the device, the load can also be a loading body which is fixedly connected to the weighing frames.

In all these embodiments, the cardan, movable or flexible joints will lie closely beneath each other in order to keep the height of the device as small as possible.

Further, means can be present for changing the position of the force introduction axes going through the load cells. In particular, it can be provided for, that said axes extend vertically, so that a direct determination of the weight of the load can take place. When the position is not vertical, the angle said axis encloses with the vertical can be determined, and the weight of the load can be determined taking this angle into consideration.

In one embodiment, each weighing frame can be connected to the lowermost situated end of the connecting elements and can extend upwards, possibly by means of a holder, into a space being higher than the uppermost situated end of the connecting element.

Although in principle, loosely positioning the load to be weighed on the weighing frames is possible, in most cases it will be provided for, that during weighing, the weighing frames will be stabilized in relation to the chassis or a auxiliary frame connected thereto, by means of a holder being provided with at least two supporting points.

A weighing device according to the invention can also be characterized in that during weighing, the weighing frames are stabilized in relation to the chassis or a supporting frame connected thereto, by means of a holder being provided with at least two supporting points.

These stabilization and fixation means can have the form of one or more pins, with at least one of them having a conical portion being able to cooperate with a conical portion of a bore provided in a part being fixedly or releasably connected to the chassis, and means being present for moving the pin in relation to the bore, in such a way that during transport of the load, the conical portion of the pin can be fixedly received in the corresponding portion of the bore.

Means can be provided for moving the weighing frames in such a way that the fixation means are put out of operation on performing a weighing.

For enabling a simple mounting of a weighing device according to the invention, it can be provided for, that a weighing frame and a supporting frame together with the connecting elements connecting them, and load cells, have been designed as a weighing unit, that can be connected to the chassis of the vehicle.

Further, it can be provided for, that at least two weighing frames have been connected by a rigid connecting member extending in longitudinal direction of the chassis, or transversely thereto.

Owing to this, in principle two or more weighing frames will function as one whole.

The connecting member can thus extend parallel to the chassis beams, and externally around the wheels, but it can also extend transversely to the chassis beams, to wit underneath these, or over them, or through recesses situated in the chassis beams.

BRIEF DESCRIPTION OF THE DRAWINGS

The invention is explained further by way of embodiments, depicted in the drawing, wherein.

DETAILED DESCRIPTION OF THE DRAWINGS

Figure 1:
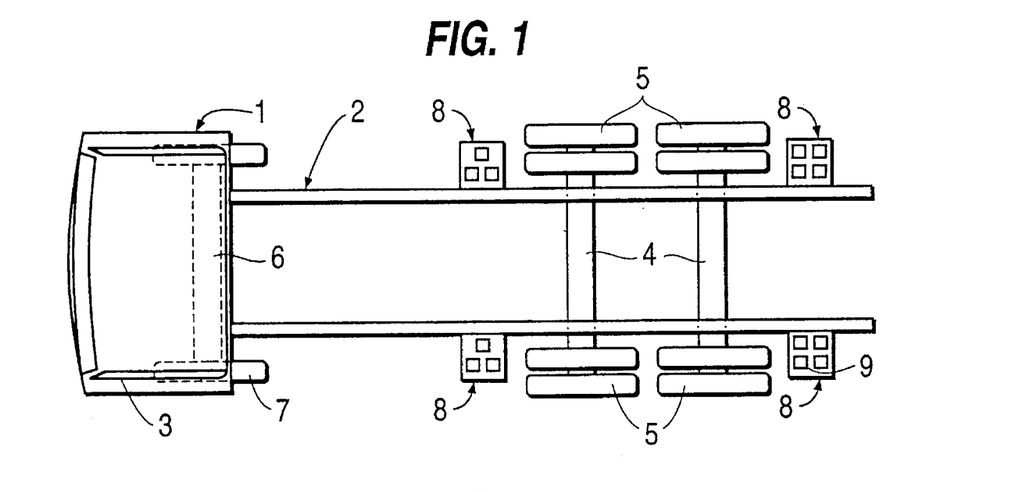
FIG. 1 shows diagrammatically a plan view of a vehicle provided with a weighing device according to the invention.

FIG. 1 shows a vehicle 1 comprising: the chassis 2, the cabin 3, the rear axles 4 with the wheels 5 and the front axle 6 with the wheels 7.

The weighing units 8 have been directly or indirectly connected to the chassis 2, in which said units can have a different number of connecting elements 9. Thus, the weighing units 8 situated in front of the rear axles 4 have been provided with three, and the weighing units 8 situated behind the rear axles with four connecting elements 9.

Figure 2:
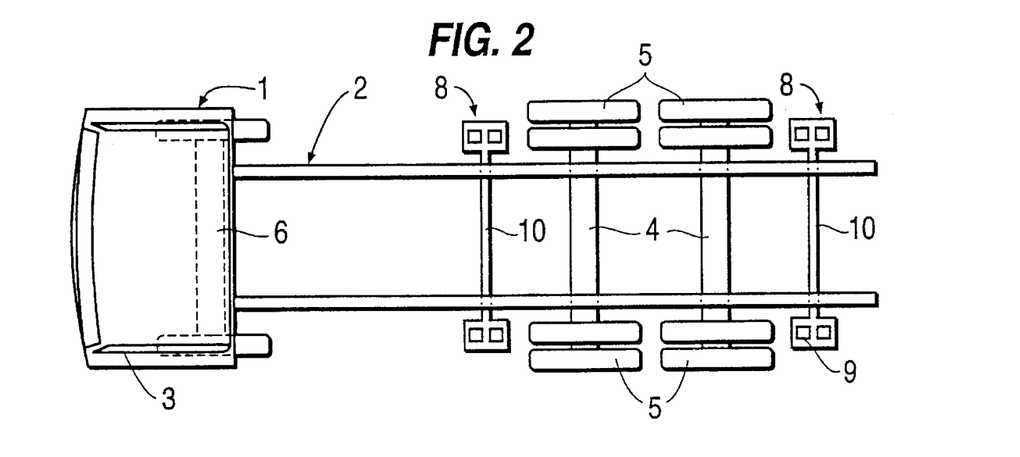
FIGS. 2 and 3 show plan views corresponding to FIG. 1, but of slightly modified embodiments.

In the embodiment according to FIG. 2, both the weighing units 8 positioned in front and behind the rear axles 4 have been provided with two connecting elements 9. The weighing units mounted at opposite sides of the chassis 2 are connected by means of connecting beams 10 extending in transverse direction.

Figure 3:
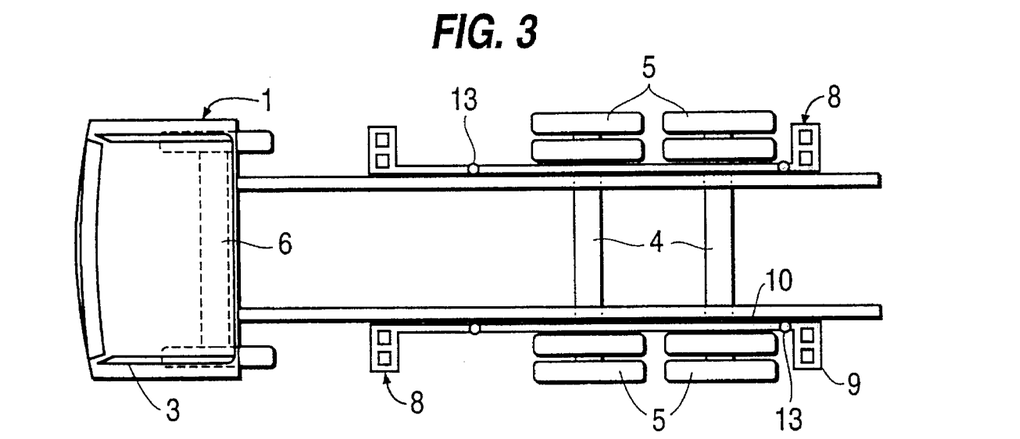

In the embodiment according to FIG. 3, the weighing units 8 have also been provided with two connecting elements 9. There, the two weighing units 8 positioned at the same side of the chassis 2 have been connected by a connecting beam 10.

Figure 4:
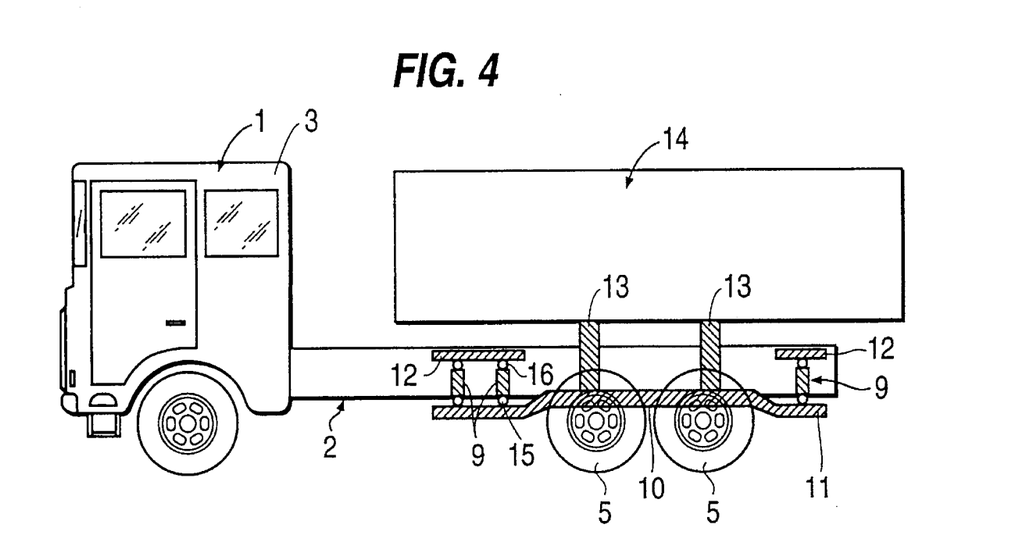
FIG. 4 shows a side view of a vehicle provided with a weighing device according to the present invention during weighing of a load.
Figure 5:
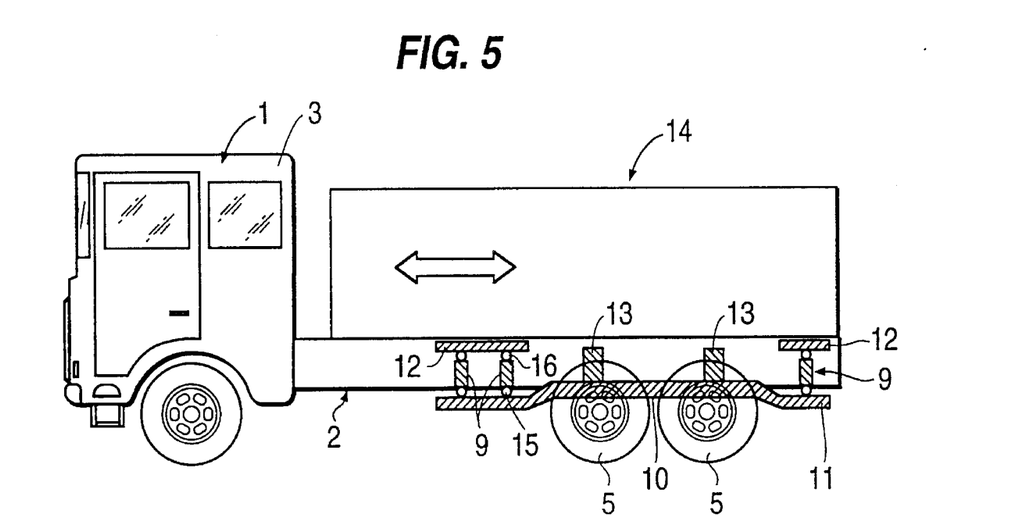
FIG. 5 shows a side view corresponding to FIG. 4, but during transport of the load.

As appears from the FIGS. 4 and 5, a connecting beam 10 establishes the connection between the weighing frames 11 of two weighing units 8 and can form a unity with these weighing frames. The connecting elements 9 of each of the weighing units 8 have been suspended from supporting frames 12, which can be connected to the chassis 2 as described below.

As also indicated in FIG. 3, hydraulic cylinders or jacks 13 have been positioned on the connecting beams 10, by which cylinders or jacks support the load. For example the container 14 can be lifted from the chassis 2, as indicated in FIG. 4. In this position of the container, it can be weighed. After weighing, by means of the cylinders 12 the container 14 is lowered onto the chassis 2 for transport thereof.

Seen in plan view, the connecting elements 9 will be situated in different vertical planes extending parallel to the longitudinal axis of the chassis.

As indicated in the FIGS. 4 and 5, a connecting element 9 has one side connected to a weighing frame 11 in the point 15 and the other side to a supporting frame 12 in the point 16. A load cell 17 can be present in such a connecting element 9, or the connecting element can be a load cell.

Instead of a container 14, one can also place a loading body or loading frame on the chassis, in which a connection between the weighing frames 11 and the loading body or the loading frame can be maintained through the cylinders 13 or jacks.

Figure 6:
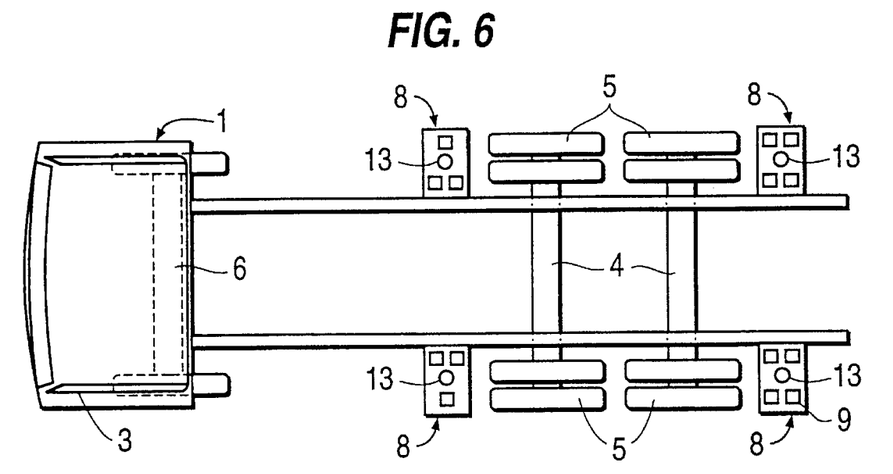
FIGS. 6 and 7 show plan views corresponding to the FIGS. 1 through 3, but of further embodiments of a weighing device according to the invention.

FIG. 6 shows the possibility of connecting the cylinders 13 or the jacks directly to the weighing frames 11. Seen in plan view, the cylinders 13 are in the middle between the connecting elements 9 connected to the weighing frames 11, so that these connecting elements will be loaded as uniformly as possible.

Figure 7:
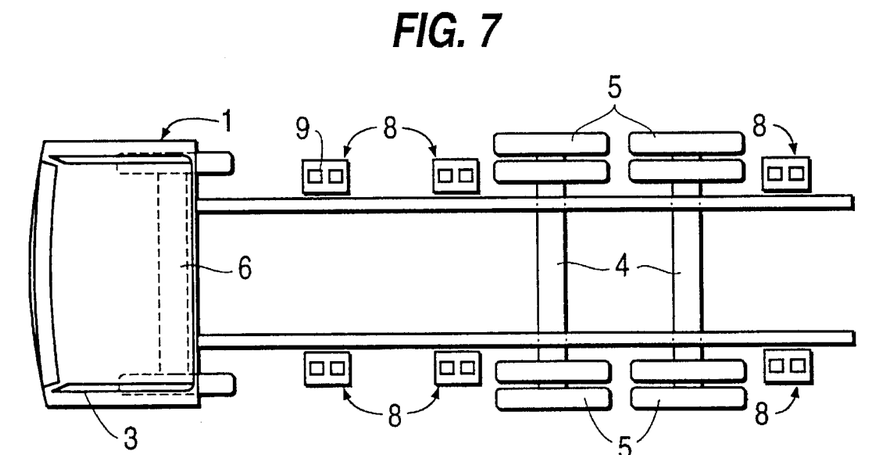

FIG. 7 shows the possibility of mounting two sets of weighing units 8 at some distance from each other in front of the rear axles 4. Thus, the force exerted by a load can be distributed over a greater distance.

Figure 8:
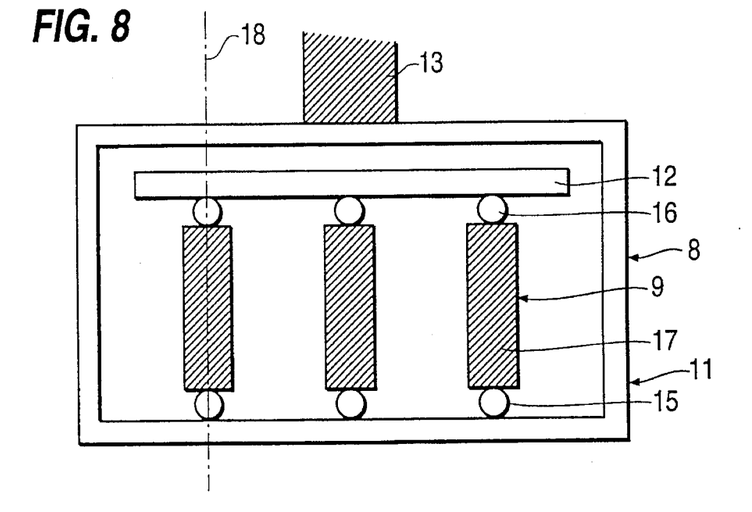
FIGS. 8 and 9 diagrammatically show side views of two weighing units according to the present invention.

FIG. 8 shows a way of executing a weighing unit 8, as it is applied in FIG. 6 for example. Here, the weighing frame 11 is of box-like shape, so that the cylinder 13 can be positioned on the upper plane thereof. Again, the weighing frame 11 has been suspended to the supporting frame 12 by means of the connecting elements 9. The connecting points of the elements 9 have again been indicated by the numbers 15 and 16. It will be obvious, that on weighing a load being supported by the cylinders 13, the elements 9 will be under strain of tension.

Figure 9:
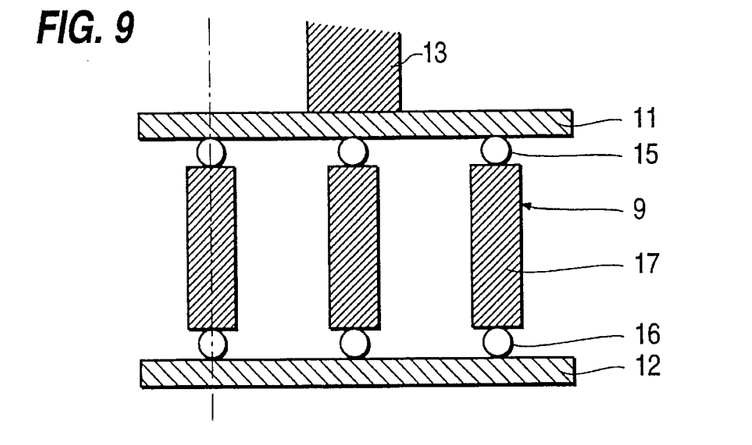
Figure 10:
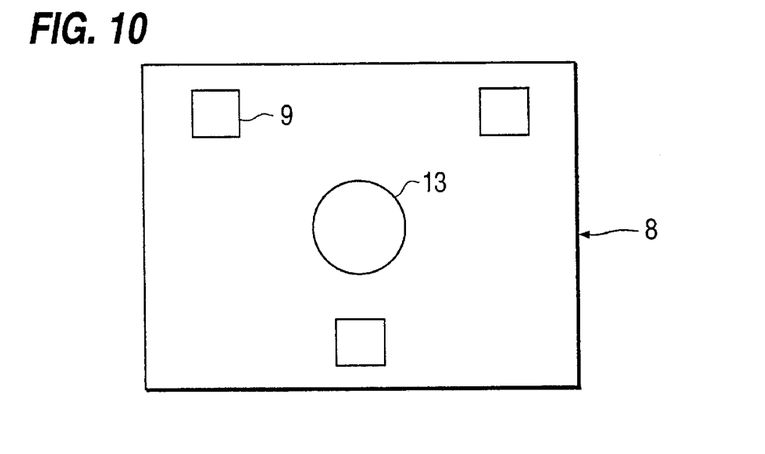
FIG. 10 shows diagrammatically a plan view of the weighing units according to the FIGS. 8 and 9.

FIG. 9 shows the possibility of mounting the weighing frame 11 above the supporting frame 12 in such a way, that the connecting elements 9 are under strain of pressure. Obviously, here means for stabilizing the weighing frame in horizontal direction will have to be provided for FIG. 10 shows diagrammatically yet another plan view of the arrangement of the connecting elements 9 in relation to the hydraulic cylinder 13, as it is applied in the embodiments according to FIGS. 8 and 9.

In FIGS. 8 and 9, a force introduction axis, going through the connecting points of the elements 9, is indicated by the reference number 18.

Figure 11:
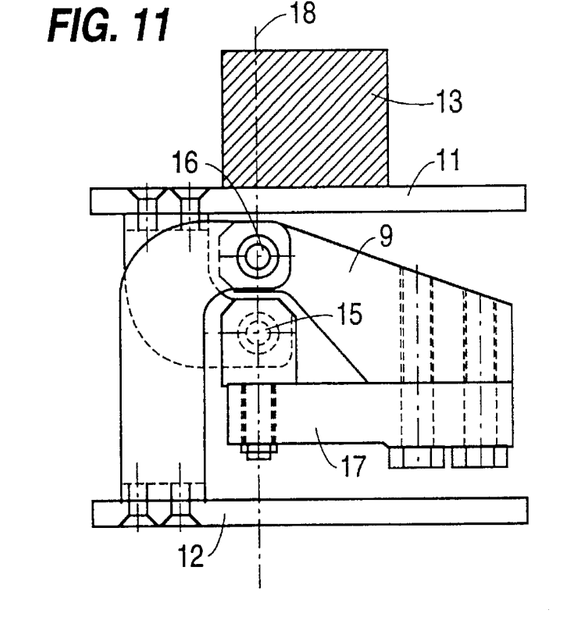
FIGS. 11, 12 and 13 show a side view, an end view and a plan view respectively, of a part of a weighing unit in which a connecting element has been applied, in which a load cell for measuring a bending strain has been incorporated.
Figure 12:
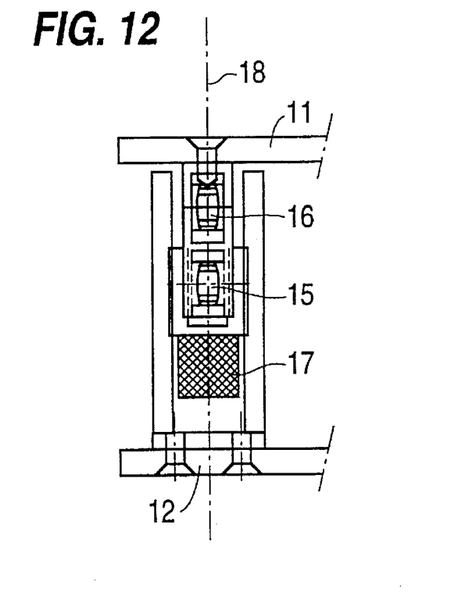
Figure 13:
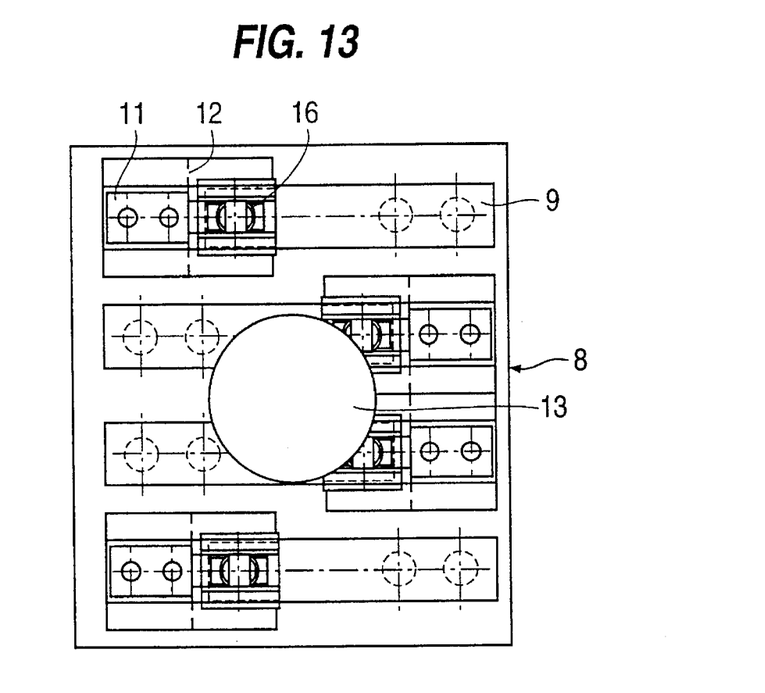

FIGS. 11, 12 and 13 show the possibility of connecting a weighing frame 11 having a cylinder 13 positioned thereon to a supporting frame 12 by means of a connecting element 9 provided with cardan-like designed connecting points 15 and 16 of a load cell 17. A strain of flexure is exerted on a part of the load cell 17, while the tensile stress generated thereby in this part is measured. The force introduction axis is again indicated by 18.

Figure 14:
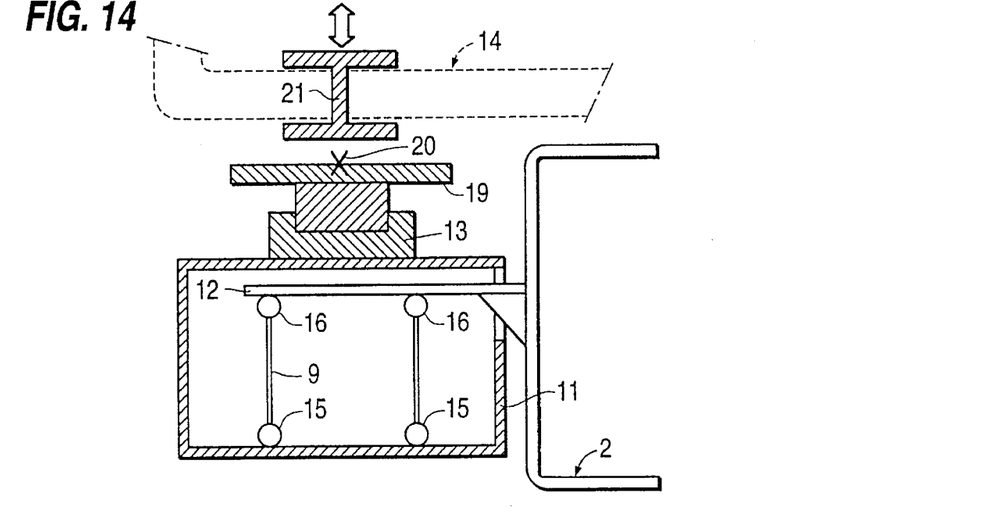
FIGS. 14, 15 and 16 show diagrammatically a cross-section, longitudinal section and a plan view respectively, of a weighing unit mounted to the chassis of a vehicle.
Figure 15:
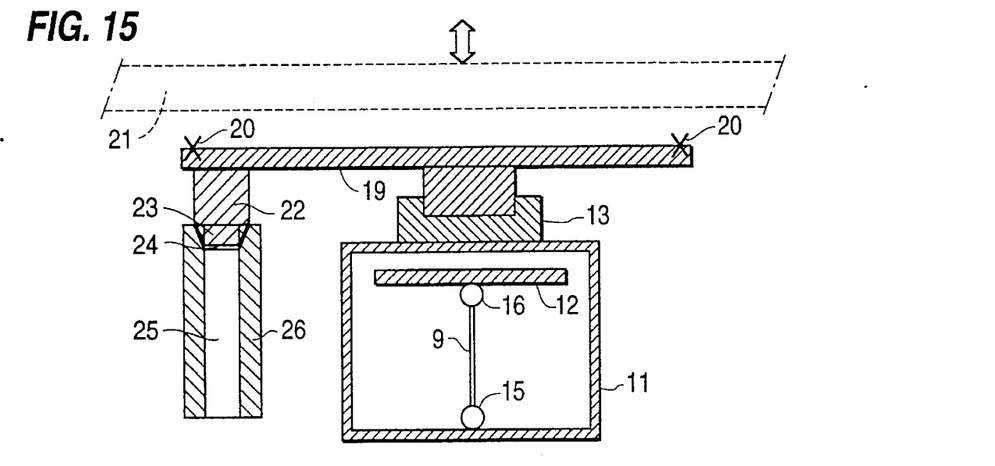
Figure 16:
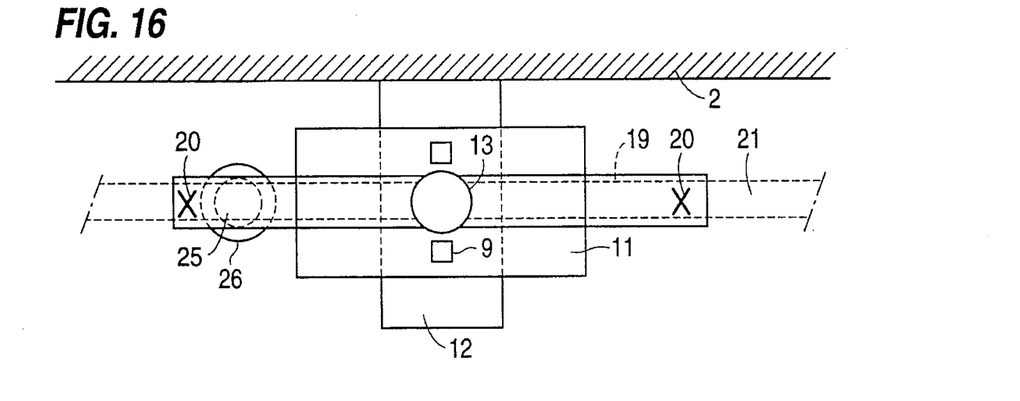

FIGS. 14, 15 and 16 show an embodiment in which a supporting member 19 for the load to be supported during weighing has been mounted on the jack 13 provided on the weighing frame 11. The supporting member 19 can be provided with at least two supporting points 20 on which a longitudinal beam 21 of e.g. a container 14 or a loading body can bear during weighing thereof. Naturally, one can also select a different number of supporting points 20. The supporting points 20 have been mounted in relation to the connecting elements 9 in such a way that, seen in plan view, the connecting line between the supporting points 20 is square to the plane going through the connecting elements 9 as appears in particular from FIG. 16.

Here, the supporting frame 12 of the weighing unit 8 is designed as a console, which can be connected to the chassis 2 of the vehicle.

The supporting member 19 is provided with a pin 22 having a conical lower end 23, which can be received in a conical portion 24 of a bore 25 provided in a bush 26 directly or indirectly connected to the chassis 2. On lowering the load, after weighing it, the portion 23 of the pin 22 will be received within the portion 24 of the bore 25, so that the load may bear on the points 20 but the connecting elements 9 will be relieved.

For stabilizing the load during weighing thereof, the pin 27 can be provided with a portion extending downwards through the bore in the bush 26 with clearance in a way not further indicated. Owing to this, the load can be stabilized during weighing.

Figure 17:
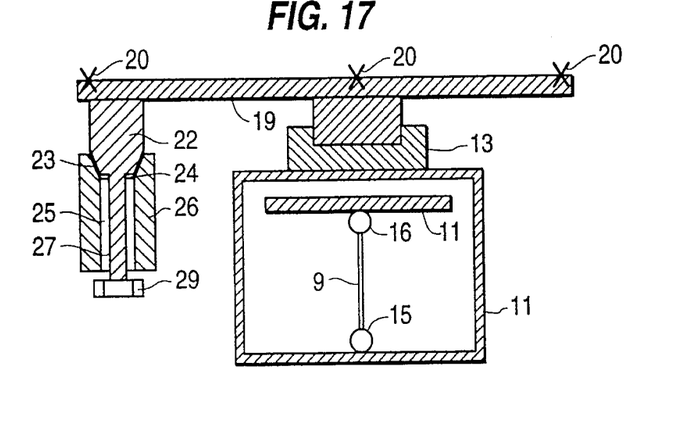
FIG. 17 shows a cross-section corresponding to FIG. 15, but of a slightly modified embodiment of a weighing unit.

The embodiment according to FIG. 17 corresponds largely to that according to FIG. 15. However, the number of supporting points 20 is greater and here the pin 22 is not only provided with the conical portion 23, but with the cylindrical portion 27 having the head 29 as well. The cylindrical portion 27 extends through the bore 25 of the bush 26. By the presence of the head 29, undesired tilting of the load, caused by a too oblique position of the vehicle, can be prevented.

Figure 18:
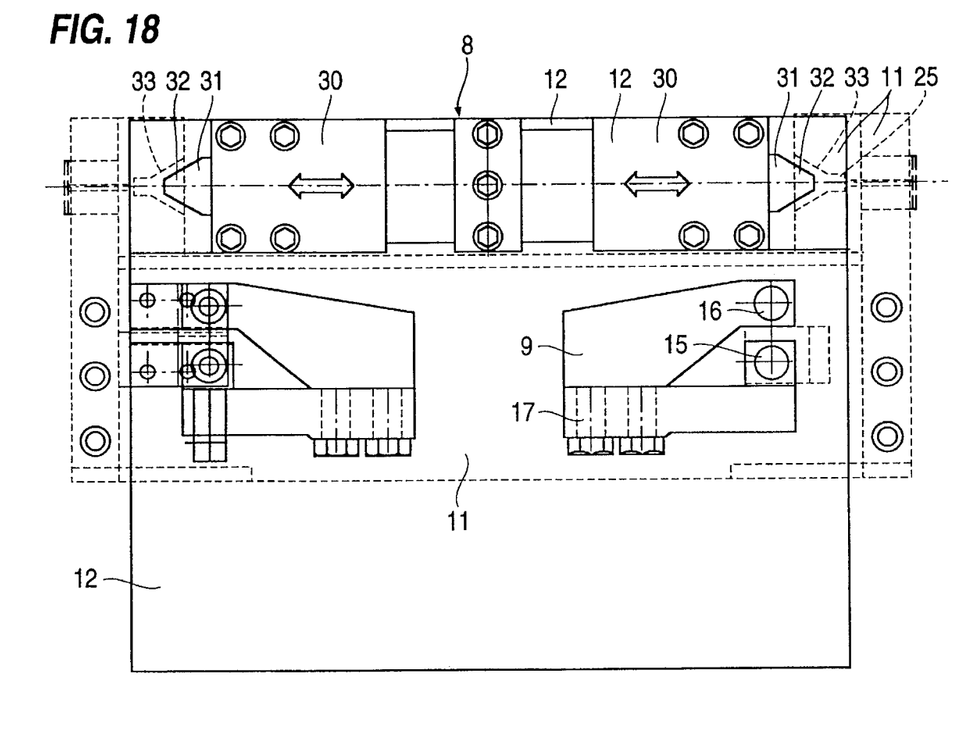
FIGS. 18 and 19 show a side view and an end view respectively, of an assembly comprising connecting elements according to FIGS. 11–13 and fixation and stabilization means.
Figure 19:
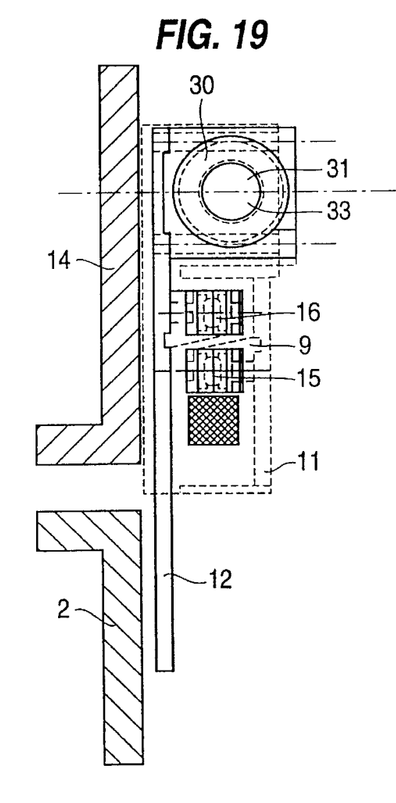

FIGS. 18 and 19 show a weighing unit 8 in which the weighing frame 11 is connected to the supporting frame 12 by means of connecting elements 9. The connecting elements 9 are connected to said frames in a cardan-like manner, in the points 15 and 16 lying close to each other. The connecting element 9 is under strain of tension and is provided with a load cell 17 of the type operating with a bending bar.

For mutual locking of the frames 11 and 12 with the weighing device switched off, the frame 11 is provided with two pressurized medium cylinders 30 being in line. The piston rod 31 of each cylinder 30 is provided with a conical portion 32 that can be received within a suitable conical portion 33 of a bore indicated by 25 and has been mounted in the portion connected to the frame 2.

Figure 20:
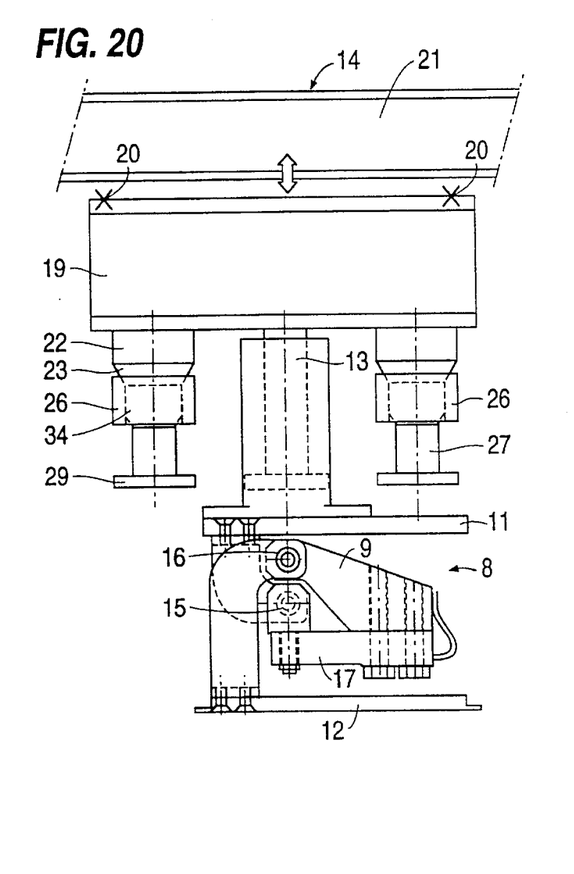
FIGS. 20 and 21 show a side view and end view respectively, of part of another embodiment of a weighing device according to the invention.
Figure 21:
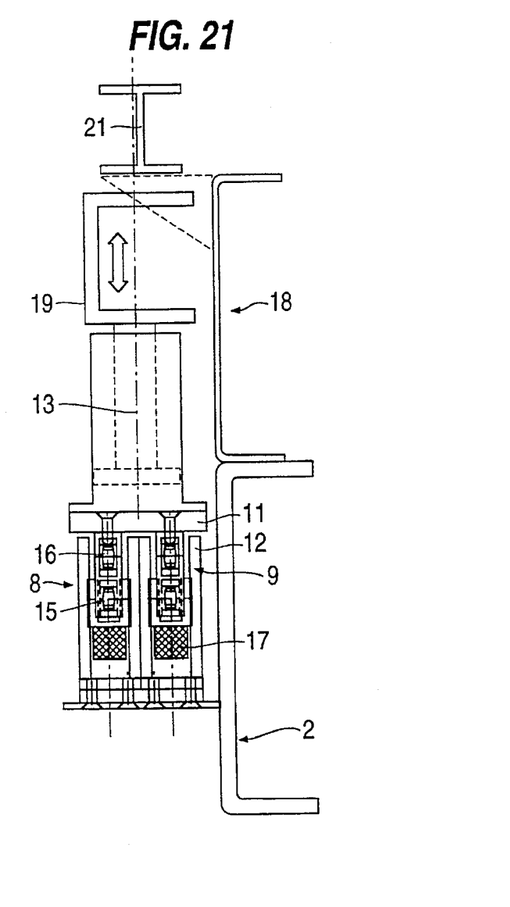

FIGS. 20 and 21 show a weighing unit 8 in which again connecting elements 9 as described by way of FIGS. 18 and 19 have been used. Again, a cylinder 13 for movably supporting a supporting member 19, with the supporting points 20 here in the shape of a longitudinal beam, has been mounted on the supporting frame 11. A longitudinal beam 21 of a container 14 or of a loading body or loading frame can be supported by the points 20. In the way as described by means of FIG. 17, the supporting member 19 is provided with two pins 22 having a conical portion 23 which can bear in a conical portion 24 of a bore 25 in a bush 26. Now, the pin 22 is further provided with a transition part 34 between the portions 23 and 27. The diameter of this transition part 34 is such, that this part can be suitably received within the bore 25 of the bush. The portion 27 having the smallest diameter is again provided with the head 29.

Figure 22:
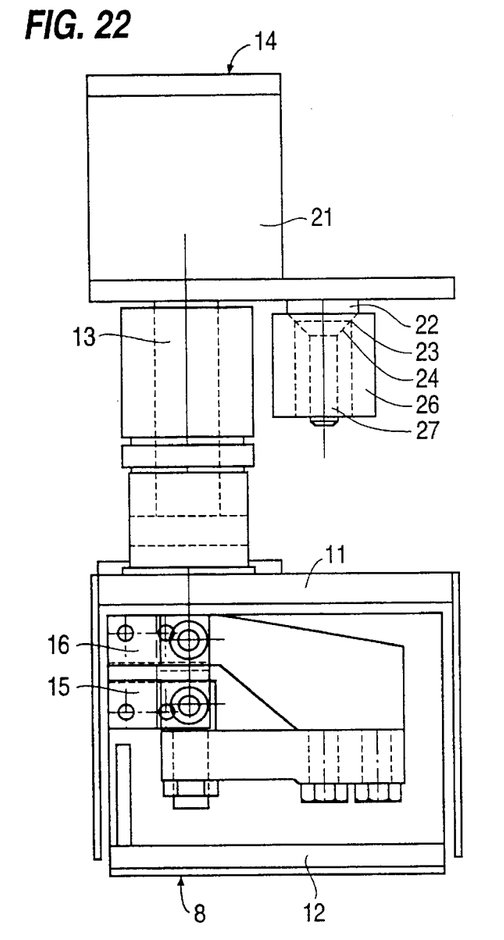
FIGS. 22 and 23 show a side view and end view respectively, of part of another embodiment of a weighing device according to the invention.
Figure 23:
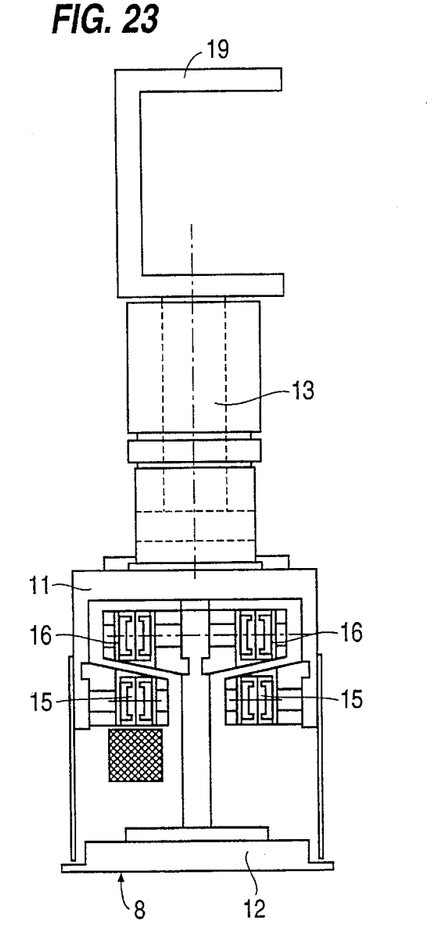

FIGS. 22 and 23 show a weighing unit 8 having two load cells 17 therein, as they were described by way of FIGS. 20 and 21. The connecting elements 9 again have been secured to the parts 11 and 12 in the points 15 and 16. The supporting plate 19 is now part of a loading frame or loading body 14 provided with a longitudinal beam 21. With the help of the jack 13, the part 14 can be lifted from its support on the chassis for weighing it. The support takes place by means of the pin 23 and the bush 26, in the same way as is described by means of FIG. 15.

Figure 24:
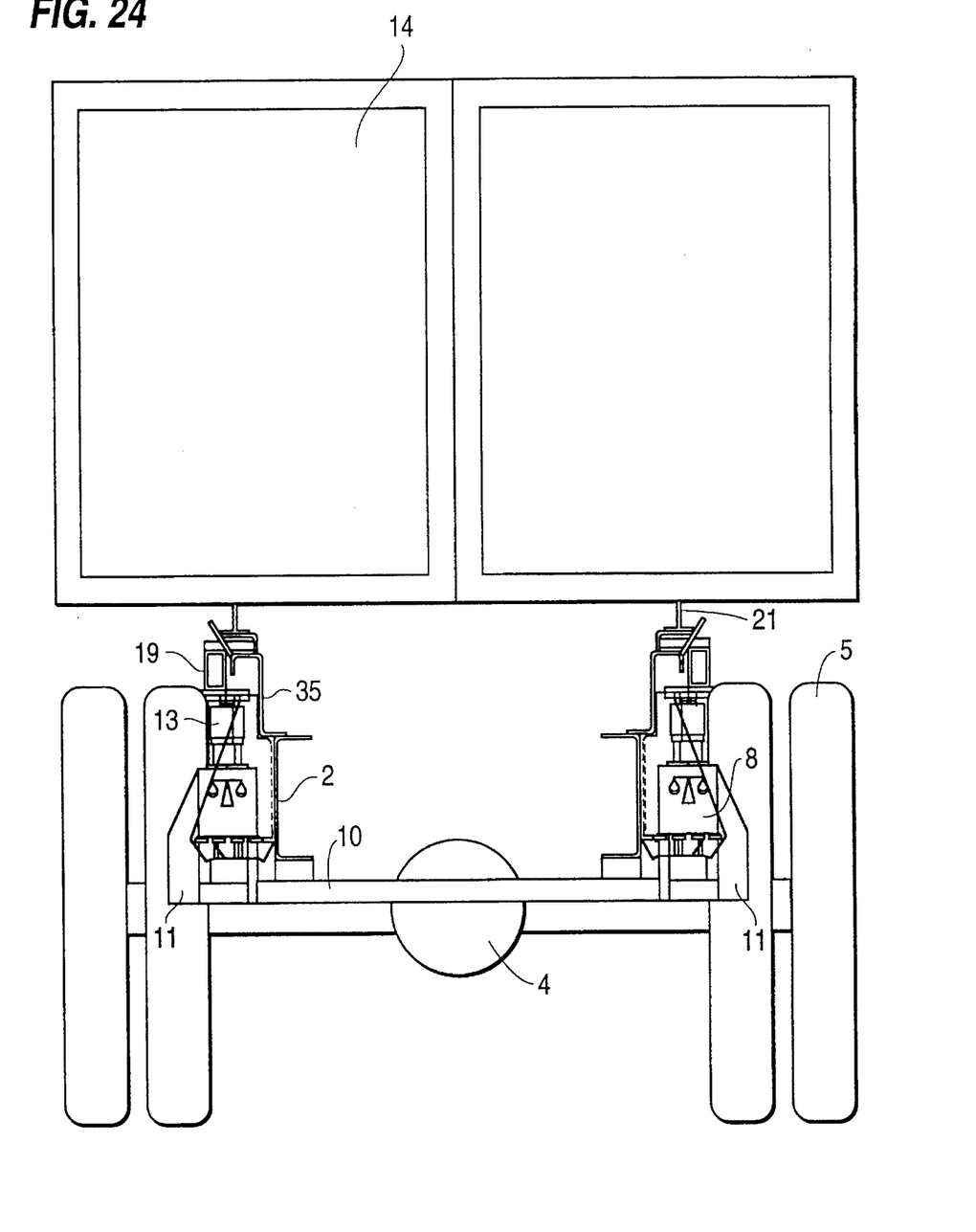
FIG. 24 shows a rear view of a vehicle provided with a weighing device according to the invention with a container mounted on the vehicle.

FIG. 24 shows a rear view of a vehicle comprising the chassis 2 having an auxiliary frame 35 thereon that can be fixedly connected to the chassis 2. In the way as shown in FIG. 2, weighing units 8 connected by the connecting beam 10 have been provided behind the rear axle 4. The container 14 is again provided with the longitudinal beams 21.

Figure 25:
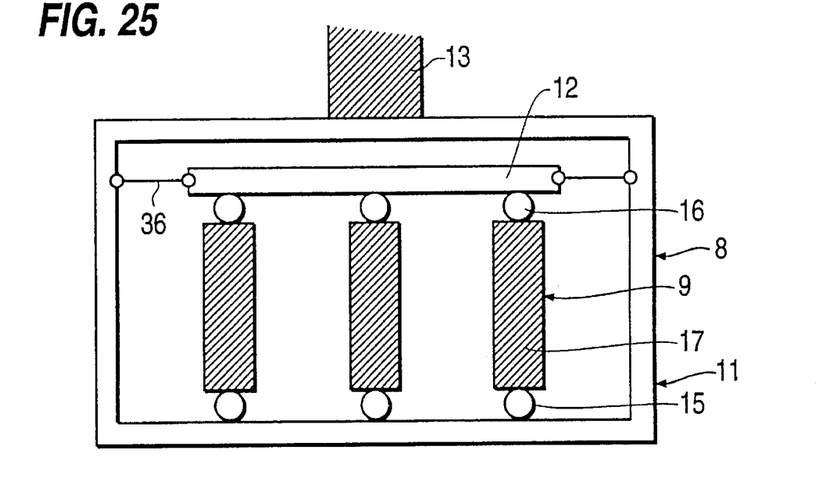
FIGS. 25, 26 and 27 show side views and a plan view corresponding to the FIGS. 8, 9 and 10, but of a slightly modified embodiment of a weighing device according to the invention.
Figure 26:
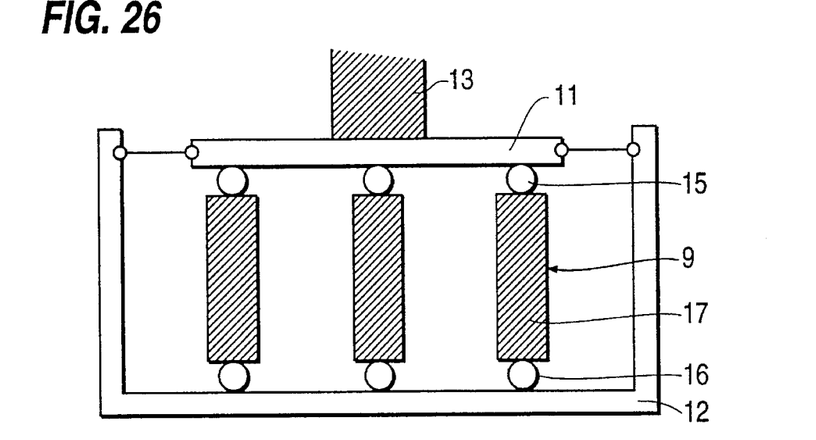
Figure 27:
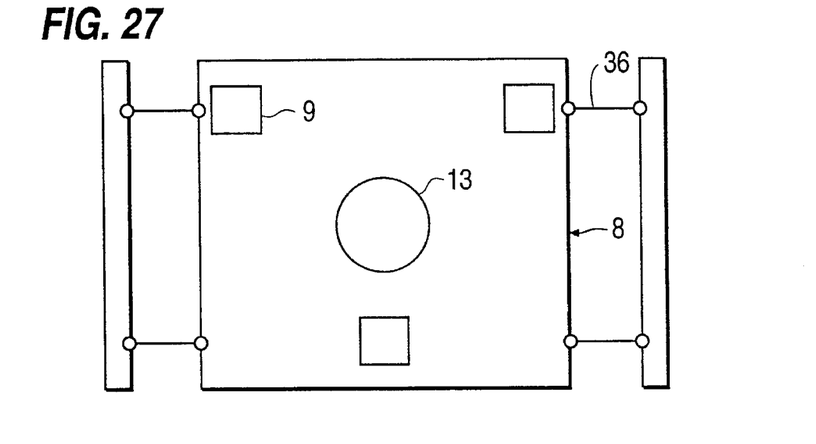

FIGS. 25 and 26 show side views and FIG. 27 shows a plan view, of weighing units principally corresponding to those according to FIGS. 8, 9 and 10. However, now the supporting frame 12, or the weighing frame 11 is laterally supported by the supporting elements 36, which possibly can be executed adjustably.

It will be obvious, that only a number of possible embodiments of a device according to the invention have been illustrated in the drawing and described above, and that many modifications can be made without being beyond the inventive idea.

I claim:

1. A weighing device adapted for mounting to a chassis of a vehicle and for weighing a load carried by the vehicle, comprising:

at least two individual weighing frames for supporting a load to be weighed suspended from the vehicle chassis;

a plurality of connecting elements each having a flexible joint having an upper end and a lower end, wherein one of the upper and lower ends of each of the connecting elements is operatively connected to the vehicle chassis and the other of the upper and lower ends is connected to one of the weighing frames to support all of the weighing frames, each connecting element having a loading cell for measuring the force exerted to the weighing frame by the load; and a plurality of lifting devices each operatively connected to the weighing frames, each lifting device being operable between an extended position where the load is lifted away from the vehicle chassis and a retracted position where the load rests on the vehicle chassis, wherein weighing of the load is made while the lifting devices are in the extended position where the load is completely supported on the weighing frames supported by the connecting elements carrying the loading cells.

2. A weighing device according to claim 1, wherein the upper end is operatively connected to the vehicle chassis and the lower end is operatively connected to one of the weighing frames to suspend the weighing frames.

3. A weighing device according to claim 1, wherein the lower end is operatively connected to the vehicle chassis and the upper end is operatively connected to one of the weighing frames to support the weighing frames from therebelow.

4. A weighing device according to claim 1, wherein the load exerts a force through an axis that connects the upper and lower ends and applies a strain to the load cell, wherein the strain corresponds to the load.

5. A weighing device according to claim 4, further comprising means for changing the position of the load exerting axis.

6. A weighing device according to claim 1, further comprising means movable between a first position and a second position for laterally supporting the weighing frames relative to the vehicle chassis.

7. A weighing device according to claim 6, wherein in the first position, the weighing frames are supported only by the connecting elements and in the second position, the weighing frames are operatively locked to the vehicle chassis.

8. A weighing device according to claim 7, further comprising at least two supporting frames fixedly connected to the vehicle chassis, wherein each of the connecting elements is connected to one of the supporting frames, and in the second position, the weighing frames are locked to the supporting frames.

9. A weighing device according to claim 8, wherein the movable means comprises pressurized medium cylinders each having a piston rod, one of the cylinder and piston rod of each of the cylinders being connected to one of the support frames and the other of the cylinder and piston rod being movable into one of the weighing frames to lock the weight frames and the support frames together.

10. A weighing device according to claim 9, wherein the number of cylinders is two, which cylinders are positioned collinearly and wherein the cylinders are connected adjacent to each other so that the pistons move in the opposite directions toward and away from the weighing frames.

11. A weighing device according to claim 1, further comprising support frames fixedly connected to the chassis, the number of the support frames corresponding to the number of the weighing frames, wherein at least two of the connecting elements are connected to each of the weighing frames and the support frames.

12. A weighing device according to claim 11, wherein at least three of the connecting elements are connected to each of the weighing frames and the support frames.

13. A weighing device according to claim 1, wherein at least four of the weighing frames are supported by the vehicle chassis through the connecting elements, with at least two of the weighing frames on each of two lateral sides of the vehicle chassis.

14. A weighing device according to claim 13, wherein at least two of the weighing frames are mounted in front of a rear wheel axis of the vehicle and two of the weighing frames behind the rear axis.

15. A weighing device according to claim 13, further comprising a rigid connecting member connecting at least two of the weighing frames in each lateral side of the chassis.

16. A weighing device according to claim 15, wherein the rigid connecting members extend below the chassis.

17. A weighing device according to claim 15, wherein one of the weighing frames connected to the connecting member on each lateral side of the chassis is positioned in front of and the other behind a rear axis of the vehicle, the connecting member extending over the rear axis.

18. A weighing device according to claim 13, further comprising at least two rigid connecting members each laterally connecting at least two of the weighing frames at the lateral sides of the chassis.

19. A weighing device according to claim 18, wherein the rigid connecting members extend below the chassis.

20. A weighing device according to claim 18, wherein one of the connecting members is positioned in front of and another of the connecting members is positioned behind a rear axis of the vehicle.

21. A weighing device according to claim 1, further comprising means for stabilizing the weight frames during weighing or transporting.

22. A weighing device according to claim 21, wherein the stabilizing means includes at least one pin having a conical element and a complementary conical portion receiving element, one of the conical element and the complementary element being operatively connected to the vehicle chassis, wherein the conical element engages the complementary portion when the lifting elements are in the retracted position.

23. A weighing device according to claim 22, wherein the pin further includes an extension extending collinearly from the conical element and the complementary element has a throughbore, the extension having a diameter smaller than the throughbore.

* * * * *